United States Patent [19]

Wilker

[11] Patent Number: 5,162,038
[45] Date of Patent: Nov. 10, 1992

[54] INFANT WARMER OPEN BED
[75] Inventor: John B. Wilker, Fairfield, Ohio
[73] Assignee: Hill-Rom Company, Batesville, Ind.
[21] Appl. No.: 827,501
[22] Filed: Jan. 27, 1992

Related U.S. Application Data

[63] Continuation of Ser. No. 444,837, Dec. 4, 1989, abandoned.

[51] Int. Cl.$^5$ .................. A61B 11/00; H05B 1/02
[52] U.S. Cl. .................. 600/22; 119/37; 219/497; 236/3; 237/3
[58] Field of Search .................. 128/30, 28, 205.26; 600/21, 22; 236/2-4; 119/35, 39, 37; 237/2 A, 3, 14; 219/497, 501

[56] References Cited

U.S. PATENT DOCUMENTS

| | | |
|---|---|---|
| 2,093,648 | 9/1937 | Rice . |
| 2,633,842 | 4/1953 | Higgs .................. 600/22 |
| 3,299,253 | 1/1967 | Lawson, Jr. . |
| 3,338,233 | 8/1967 | Stafford et al. . |
| 3,529,131 | 9/1970 | Gordon et al. . |
| 3,646,319 | 2/1972 | Auld . |
| 3,667,476 | 6/1972 | Muller . |
| 3,789,853 | 2/1974 | Reinhard .................. 600/22 |
| 3,821,947 | 7/1974 | Schossow . |
| 4,034,740 | 7/1977 | Atherton et al. .................. 600/22 |
| 4,312,331 | 1/1982 | Hahmann . |
| 4,331,161 | 5/1982 | Patel . |
| 4,399,823 | 8/1983 | Donnelly . |
| 4,399,824 | 8/1983 | Davidson . |
| 4,750,474 | 6/1988 | Dukhan et al. .................. 600/22 |
| 4,969,459 | 11/1990 | Gusakov .................. 128/399 |
| 5,053,605 | 10/1991 | Thorax et al. .................. 219/501 |

OTHER PUBLICATIONS

Swyer, P. R., "Thermoregulation In The Newborn", The Thermal Environment of the Newborn, pp. 773-790.
Agate, F. and Silverman, W., "The Control of Body Temperature In The Small Newborn Infant by Low-Energy Infrared Radiation", pediatrics (May 1963), pp. 725-733.
Robinson, R. O., and Jones, R., "Advantages and Disadvantages of Overhead Radiant Warmers", Proceedings, Royal Society of Medicine (Mar. 1977), vol. 70, pp. 209-211.
Radiant Warmer, Narco Air-Shields Co., Infant Care Systems, Detail Aid 7802 (Apr. 1980).
Wheldon, A. and Rutter, N., "The Heat Balance of Small Babies Nursed in Incubators and Radiant Warmers", Early Human Development, Elsevier Biomedical Press, (1982), vol. 6, pp. 131-143.
Baumgart, S., "Partitioning of Heat Losses and Gains in Premature Newborn Infants Under Radiant Warmers", Pediatrics (Jan. 1985), vol. 75, No. 1, pp. 89-99.
Radiant Warmer, Ohmeda Co., BOC Health Care, Ohio Infant Warmer Systems Tech. Information (Nov. 1985), Form No. DO16.
Radiation Warmer, Atom Medical Corp., (Dec. 1985), V-3200N.
Radiant Warmer, Hill-Rom Co., Stabilet 2000 Product Specification (Nov. 1989), pp. 1-6.
Radiant Warmer, Hill-Rom Co., Stabilet CC 1500 Product Specification (Dec. 1989), pp. 1-6.

Primary Examiner—Lee S. Cohen
Assistant Examiner—Kevin Pontius
Attorney, Agent, or Firm—Wood, Herron & Evans

[57] ABSTRACT

An infant warmer is provided with a heating element for directing radiant heat onto an infant support surface and a temperature sensing probe attachable to the skin of an infant. A heater control which, in an automatic mode, supplies a control signal to a heater power control which includes a component responsive to the difference between the actual temperature and a set temperature and a component which is added or subtracted in incremental amounts depending on whether the actual temperature is above or below the set point. The control also operates to reduce the power to the heater when the total energy supplied to the heater exceeds a maximum amount over a predetermined time interval. In manual mode, the power level is reduced when a preset temperature is reached or if the temperature is not reached after a predetermined time has elapsed. In addition, the heater power is interrupted whenever the control signal or the current to the heater exist independent of the other. The features operate to provide highly responsive temperature regulation and enhanced safety.

12 Claims, 4 Drawing Sheets

INFANT WARMER OPEN BED

This application is a continuation of application Ser. No. 07/444,837, filed Dec. 4, 198

The present invention relates to infant care beds and more particularly to infant warmer open care beds for providing temperature regulation of infants in maternity and newborn care facilities.

BACKGROUND OF THE INVENTION

Neonatal facilities of hospitals require, under current care standards, the provision of infant beds which will automatically maintain the baby's environment within acceptable temperature limits. This necessitates the use of heating elements with controls which will effectively regulate the heat delivered to the unit in response to sensors in the bed which monitor the temperature in the vicinity of the baby and, preferably, the actual temperature of the baby's skin. It is desirable that the controls for such warmers have, in order to reliably regulate the baby's temperature, a stable and accurate control, and one which will also be responsive to abnormal and potentially unsafe conditions which require an alarm or other response.

Two types of controls have been available to regulate the temperature of infant warmers. One is the proportional or analog control by which power to a heater is varied as a function of the difference between the actual sensed temperature and a temperature setpoint. The other is the on/off type control or switching control which alternately energizes the heater, usually at a single power level, and switches off the heater, depending on whether the actual temperature is either below or above a setpoint, or below a lower minimum setpoint or above an upper maximum setpoint.

In proportional control, the temperature is usually controlled by gradually reducing the heater output as the setpoint is approached and/or exceeded, eventually turning off the heater when a maximum temperature is reached. If the temperature range around the setpoint over which the heater output is varied is wide, a very stable temperature control can be achieved, at least where the ambient conditions are stable. This is known as a loose proportional control. However, the amount of heat required to maintain the setpoint is a variable depending on external conditions which affect the rate at which heat energy is lost from the bed or unit. Where ambient conditions vary, loose proportional control may equilibrate at a temperature other than the setpoint. The equilibrium temperature which such a control may produce can, depending on ambient conditions, equal any temperature in the range of temperature over which the heater power is being tapered. The conditions which affect the equilibrium temperature would include such ambient conditions as air movement (wind chill), the proximating of attending or visiting personnel, or the operation of building heating and air conditioning equipment. Thus, although proportional control is desirable for stability, it is undesirable for accuracy.

In ON-OFF type of control, the temperature is regulated by switching the heater to full power until the measured temperature exceeds the setpoint by a specified amount, then switching the heater off until the temperature drops below the setpoint by a specified amount. This type of control continually overshoots and undershoots the setpoint by the amount of hysteresis which is dependent on the heater power level and the heat loss rate of the unit. While this type of control at least brings the temperature completely to the set point, the temperature oscillates about the setpoint so that it is neither smooth nor stable.

Infant warmers of the prior art possess at least one of the disadvantages of the proportional or on/off control systems described above.

Furthermore, although most infant warmers have high and low temperature alarms, incidents of overheating still occur with prior art devices due to the temperature sensing probe being partially dislodged from the skin of the infant or misapplied in such a way that the probe senses a slightly lower temperature than the actual skin temperature. In addition, the probe can be completely off the infant but positioned in such a manner as to be heated by the heating element, which is often a radiant element, to the temperature setpoint when the temperature of the infant is actually above or below the setpoint. All radiant warmers with servo control are subject to this hazard. When this problem occurs, since the temperature sensed may be within an allowable range of values, no alarm would be activated and the heater output may be regulated at too high or too low a temperature. Alarm systems based on temperature rely on the skin probe to sense the correct skin temperature of the infant. If the probe is not installed correctly, the alarms may not respond to the proper alarm condition.

Also, many radiant infant warmers have a manual mode of operation for use in situations where it is impossible or difficult to use the skin probes. This may be the case in a labor-delivery room, for example. When operating in such a manual mode, the temperature display is normally still active and reads whatever temperature the probe may be sensing as it rests in the warmer bed. Some warmer beds have a slide switch to select between servo and manual modes. This presents a possible hazard condition in that the warmer may be in manual mode and displaying a temperature that is within the range of an infant's skin temperature. In fact, the skin probe may be attached to the infant while the nurse may not notice that the switch is in manual mode. Depending on the manual heat setting, the infant may receive too much or too little heat.

In some heater beds, the heater power is controlled by a thyristor semiconductor device commonly known as a triac. A common failure of thyristors is to become shorted or to turn on when they should be off. This may result from electrical disturbances on the power lines. When this occurs, the heater turns on and is uncontrollable. This is of course very hazardous.

Each of the problems described above are problems currently existing in the art. Accordingly, there exists a need in the art to overcome the problems.

SUMMARY OF THE INVENTION

It is a primary objective of the present invention to provide for the regulation of the temperature of an infant in an infant warmer bed in a manner which is both accurate and stable.

It is a further objective of the present invention to provide an infant warmer bed control which reliably protects the infant against overheating.

It is an additional objective to adequately protect the infant in an infant warmer bed from improper temperature regulation in the case of use of the warmer in a manual mode.

It is a still further objective of the present invention to provide a control which protects the infant in the case of heater control malfunction.

According to the principles of the present invention there is provided a temperature control having the characteristics of an analog proportional control without the error associated with a conventional proportional control. This is accomplished by employing a circuit that adjusts the heater output up or down over a limited range until the proportional control equilibrates at a predetermined setpoint temperature. The adjustment made in this way compensates for changes in heat loss rate due to drafts and other such factors.

In accordance with the preferred embodiment of the invention, the control is initialized when powered up such that the heater output will be delivered at an intermediate value, for example 50% of maximum power, when the measured temperature is equal to the setpoint temperature. The actual amount of heater power, however, may be offset from between 10 and 90% of maximum controllable power range. Then, at widely spaced time intervals of, for example, two minutes, the temperature offset is incremented either up or down depending on whether the measured temperature is above or below the setpoint.

Also in accordance with principles of the present invention, an alarm is provided to signal excessive heating, to protect the infant. It functions by monitoring the amount of total heat delivered over a specified period of time. If the amount of heat delivered is more than normally expected as, for example, may be predetermined from statistical data for the particular type of warmer, then the system actuates an alarm and the power is reduced to a value predetermined to be at or below a maximum safe value, for example, at half power.

Further, in accordance with principles of the present invention, a control for an infant warmer bed is provided with an automatic reset to a manual mode when the system is first powered up or when a prewarm option is selected by, for example, the pressing of a button. The control, however, immediately switches to a servo or automatic temperature control mode when the skin probe senses a temperature the set-point temperature, preferably a temperature of 31° C. In accordance with the preferred embodiment of the invention, the temperature display is turned off if the unit is in manual. Then, when the system senses warmth on the temperature probe, the system latches into servo mode, turns on the temperature display and activates all safety alarms. Thus, the likelihood of having the system in manual mode and thinking it is in servo mode is substantially reduced.

Still, in accordance with other principles of the present invention a heater current signal proportional to the actual heater current is compared with the heater control signal from the proportional controller. If, at any time the two signals do not agree, a system fault alarm is activated. Preferably, the system fault alarm removes AC power from the heater by means of an electromagnetic relay and sounds an audible alarm and lights all fault indicators.

The present invention provides an infant warmer bed with stable and accurate temperature regulation, and with protection for the infant against overheating, inadvertent manual mode operation and power circuit failure.

These and other objectives and advantages of the present invention will be more readily apparent from the following detailed description of the drawings in which:

DETAILED DESCRIPTION OF THE DRAWINGS

Figure 1:
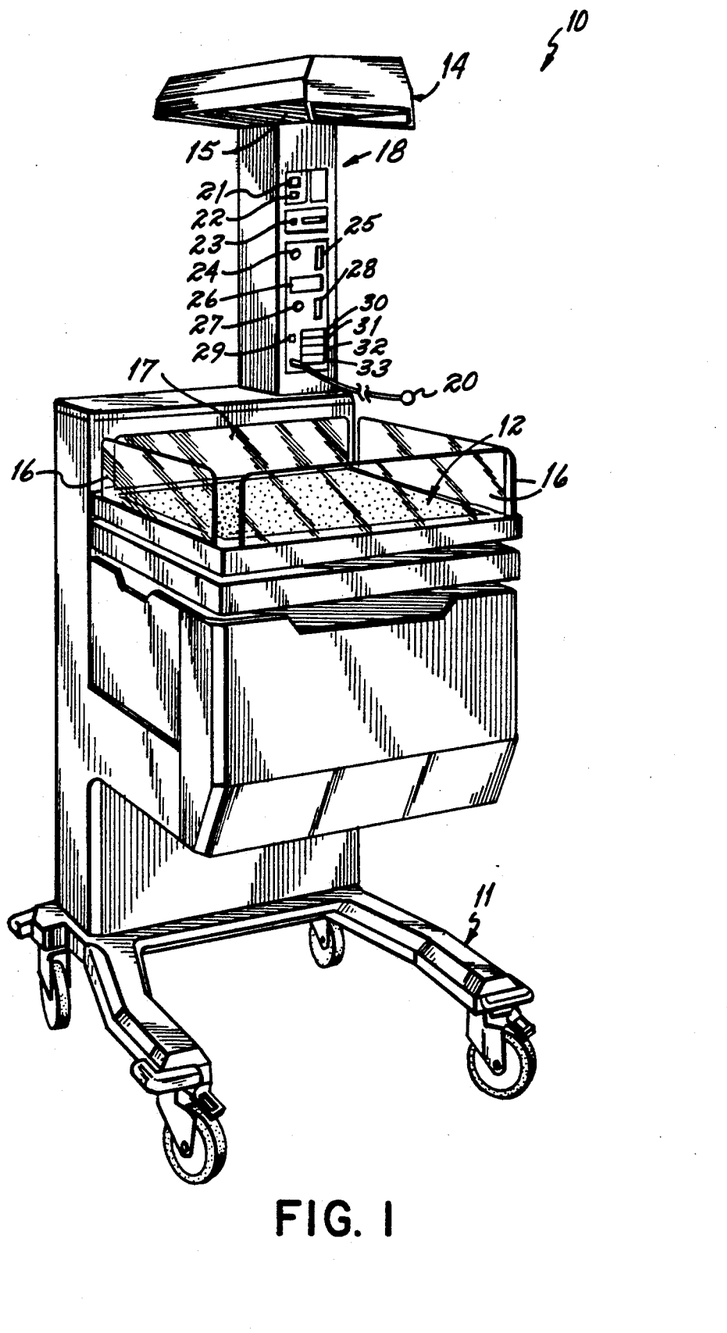
FIG. 1 is a perspective view of one preferred embodiment of an infant warmer bed in accordance with the principles of the present invention.

Referring to FIG. 1, an infant warmer bed 10 according to a preferred embodiment of the present invention is illustrated. The unit 10 includes an upstanding base 11 which has supported thereon a horizontal procedure table or bed 12. Supported at the top of the base or frame 11 is a warmer and lighting module 14 which includes a radiant heating element 15 directed downwardly onto the surface of the bed 12 so as to warm the bed 12 when energized. The bed 12 is enclosed on its sides by upstanding walls 16 with an open top 17. Above the bed 12 on the frame 11 is a panel 18. Connected through a cord to the panel is skin temperature probe 20 attachable to the infant's skin for sensing the baby's skin temperature The panel 18 is illustrated in detail in FIG. 2.

Figure 2:
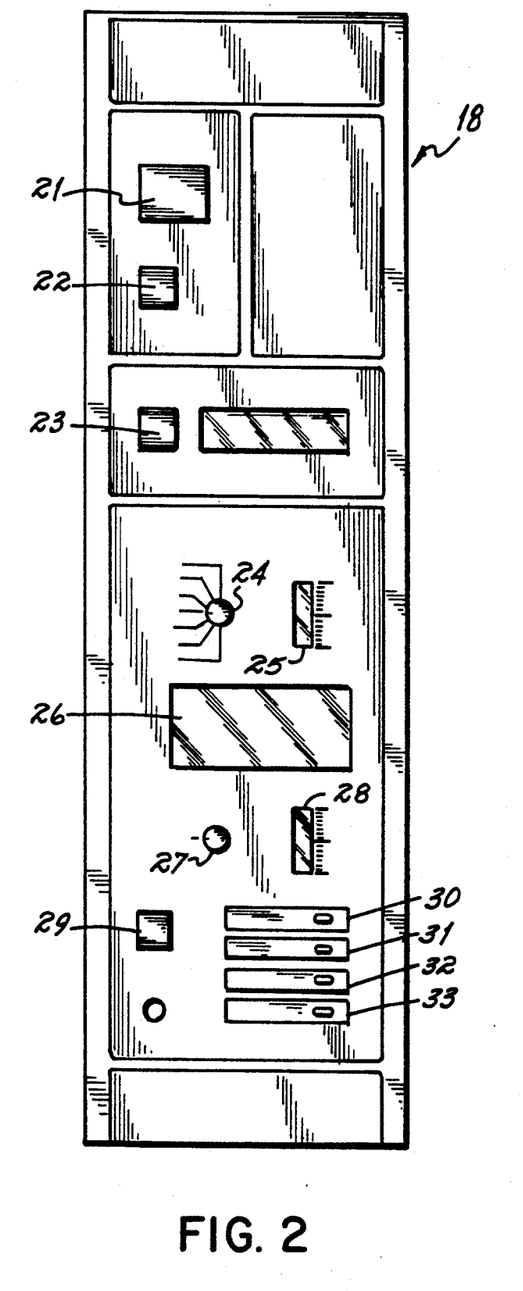
FIG. 2 is a view of the control panel of the embodiment of FIG. 1.

Referring to FIG. 2, the control panel 18 according to the preferred embodiment is illustrated. On the control panel 18 are mounted controls which include a power on-off push button switch 21, a lighting on-off push button switch 22, an Apgar timer on-off push button switch 23, a temperature setting control 24, a servo mode heater power indicator 25, an infant temperature display 26, a heater power control manual mode silence push button switch 29, and alarm indicators including an overheating indicator 30, "hi/lo" temperature indicator 31, over 39° C. indicator 32, and probe fault indicator 33. The controls and the indicators of the control panel 18 are elements of the control circuit illustrated in the circuit block diagram of FIG. 3.

Figure 3:
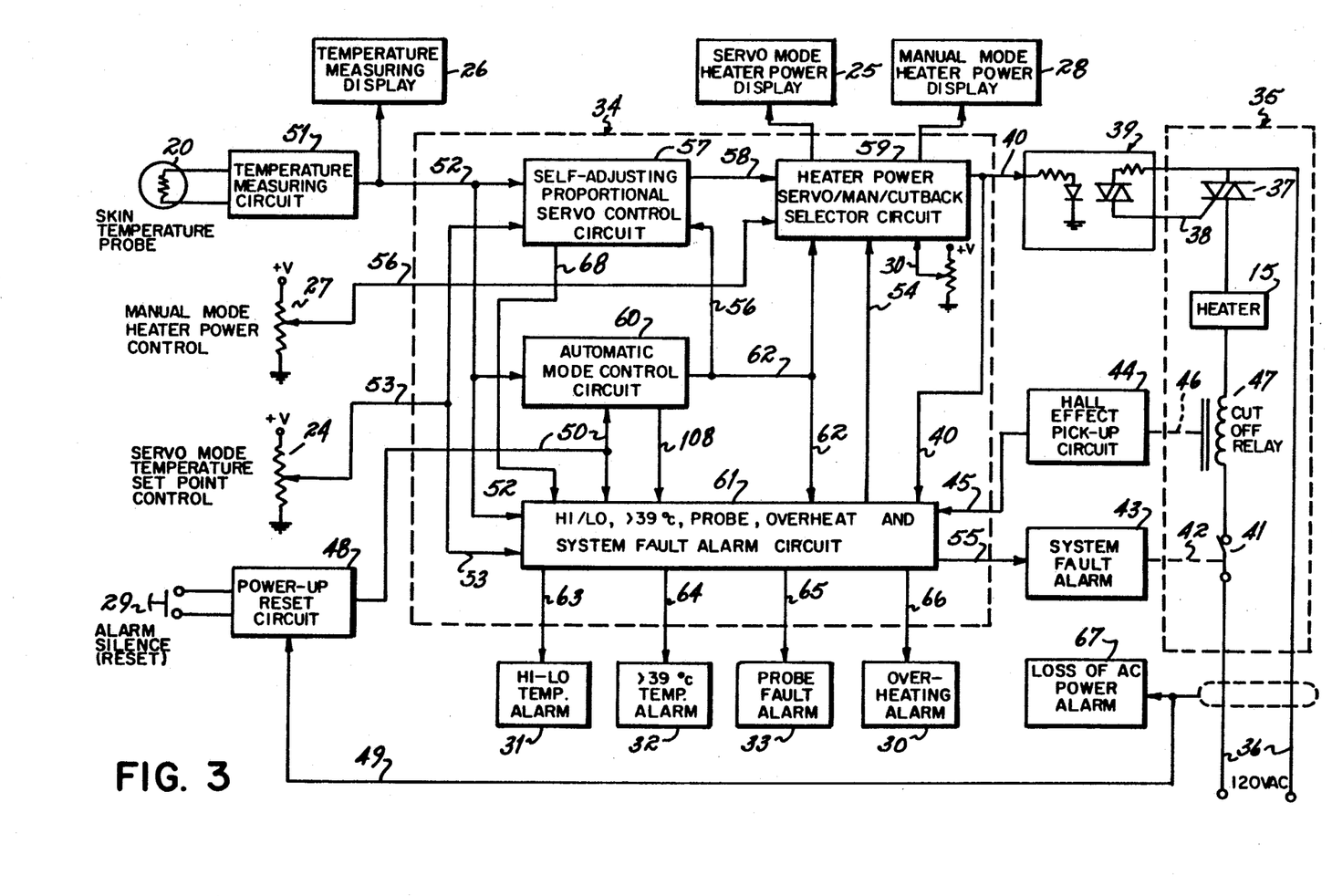
FIG. 3 is a schematic block diagram of a control circuit of the embodiment of FIG. 1.

FIG. 3 illustrates the controller operated from the control panel 18 to control the heater element 15. The control includes a control circuit 34 connected between the controls on the panel 18 and a heater power circuit 35 which energizes the heater element 15. The heater element 15 is connected into the circuit 35 across the leads of a supply cord 36 connectable to a source of AC power, typically 120 VAC 60 Hz. The heater element 15 is connected in the circuit 35 in series with a heater power control triac 37. The triac 37 has a control input 38 connected to the output of a triac driver circuit 39. The triac driver circuit 39 has an input connected to the power control output 40 of the control circuit 34. A normally closed cut-off relay 41 is also connected in series with the heater 15 and the triac 37 in the circuit 35. The relay 41 has an actuator 42 which is coupled to operate in conjunction with the system fault alarm 43.

A Hall-effect current sensor 44 is provided for generating a signal at a monitoring input 45 of the control circuit 34. The detector 44 has a sensor input 46 coupled to a current responsive indicator 47 connected in series with the heater circuit 35.

A reset circuit 48 is provided having an input 49 coupled to circuit 35 to provide a power-up reset momentary signal at a reset input 50 of the circuit 34. The reset circuit 48 has a second input from the alarm silence pushbutton 29. Operation of the alarm silence pushbutton 29 also causes a reset signal to be generated on a reset line 50 to the circuit 34.

The control circuit 34 includes four subcircuits which include a self-adjusting proportional servo-control circuit 57, a heater power servo/ manual/cutback selector circuit 59, an automatic mode control circuit 60 and a "hi/lo", 39° C., probe, overheat system fault alarm circuit 61.

The skin temperature probe 20 is connected to the input of a temperature measuring circuit 51 which has an output 52 on which a signal proportional to the measured skin temperature is delivered to a temperature signal inputs of the proportional control circuit 34 and the alarm circuit 61 of the control circuit 34. The temperature setting control 24 is connected to a temperature setpoint input 53 of the proportional control 57 and alarm circuit 61 of the control circuit 34. The manual mode heater power setting control 27 is connected to a manual power level input 56 ,of the control circuit 34.

The self-adjusting proportional control 57 has a pair of inputs connected one to the temperature signal output 52 of the temperature measuring circuit 51 and the other to a setpoint signal line 53 of the servo temperature setpoint control 24, and an output for delivering an analog signal on a line 58 to an input of the heater power selector circuit 59.

The heater power selector 59 is a dual analog switch circuit which selects one of three signals from either of three inputs connected respectively to the proportional control circuit 58, a manual control line 56 from the manual control 27, or a preset default level signal line 30 in response to signals from the output 62 of the automatic mode control circuit 60 or from an output 54 the alarm circuit 61. The output signal on output line 40 of the power selector circuit 59 is delivered to the input of the triac driver circuit 39. The triac driver circuit 39 is an optical coupled triac which operates to deliver a gate signal on the gate input 38 of the heater power control triac 37 to cause it to control the power in the power circuit 35 in accordance with the analog signal output 40 of the control circuit 34.

The automatic mode control circuit 60 has three inputs, one of which is connected to the temperature signal input 52 of the circuit 34, another of which is connected to the reset signal input 50 of the circuit 34, and a digital output signal line 62 connected to the alarm circuit 61 and the heater power selector circuit 59.

The control circuit 34 has as its fourth subcircuit, an alarm circuit which has seven inputs and six outputs.

The inputs to the alarm circuit 61 are reset input from reset line 50, the servo/manual mode signal input from the output 62, a "31° C." signal input 108 from the mode control circuit 60 of control circuit 34, a temperature signal from line 52, a measured temperature-setpoint input 68 from the servo-control circuit 57, the heater drive signal from output line 40 of circuit 34, and an input from the heater current signal input 45 from the hall effect pick-up circuit 44. The outputs from the alarm circuit 61 are a hi/lo temperature alarm signal output 63, a 39° C. alarm signal output 64, a probe fault signal output 65, an overheating alarm signal output 66, a preset power signal output 54 to the heater power selector circuit 59 and a system fail signal output 55 to the system fail indicator 43 and cutoff relay 41. The output signals 63,64,65,66 drive respective alarm indicators 31,32,33,30 (not shown) on the panel 20.

The reset circuit 48 has two inputs, one is the alarm silence, pushbutton 29, the other is a sensor input 49 sensing the presence of line power 49. The circuit 48 has one output 50 connected to the control circuit 34. A power loss alarm circuit 67 is provided for sensing the loss of AC power circuit. The circuit 67 has an input connected to sensor line 49 for sensing the presence of AC line power, and has an audible signaling device contained therein for producing an audible alarm output.

Figure 4:
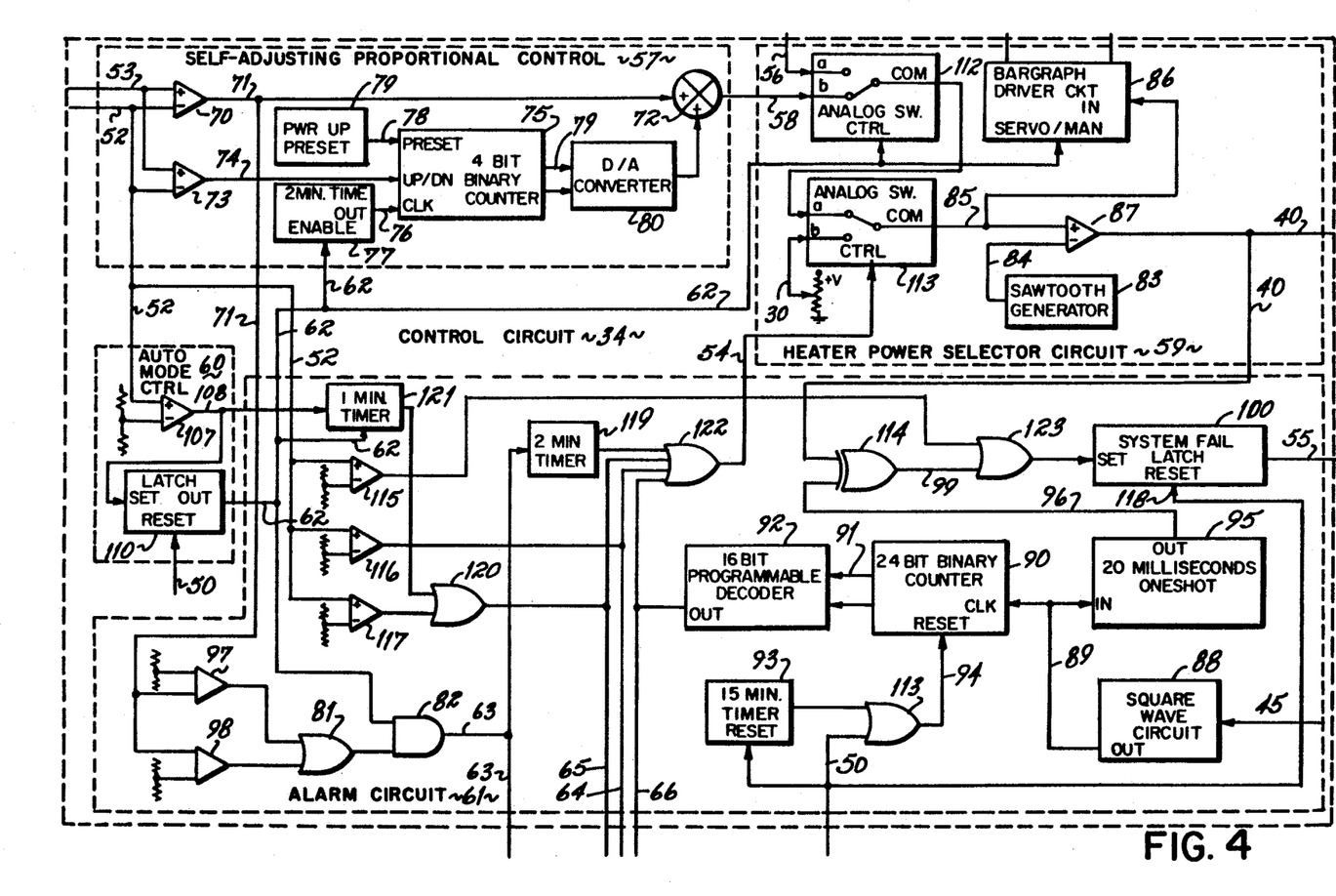
FIG. 4 is a circuit block diagram of portions of the circuit of FIG. 3.

The details of the subcircuits 57, 59, 60 and 61 and of the related circuitry are illustrated in greater detail in the block diagram of FIG. 4.

Referring to FIG. 4, the self adjusting proportional control circuit 57 is illustrated. It includes a differential amplifier 70 having a pair of inputs connected one each to the temperature signal input line 52 and the temperature setpoint signal line 53. The circuit 57 also has an output signal line 71 connected to a summing network 72 and to an input of the alarm subcircuit 61. The circuit 57 further includes an analog comparator circuit 73 which is provided also with a pair of inputs connected, one each to the temperature signal 52 and the setpoint signal 53, and having an output 74 connected to an up/down control input of a 4 bit binary up/down counter 75. The comparator 73 produces a digital signal output 74 indicative of which of the two analog signals connected to the inputs, 52 & 53 is greater in voltage.

The counter 75 has a clock input 76 connected to the output of a long time interval timer circuit 77. This causes the counter 75 to step up or down in accordance with the state of the up/down input 74 at a slow rate, for example every two minutes. The counter also has a preset input 78 which sets the counter to an intermediate value, for example "8" upon power-up of the unit 10. The counter 75 has a parallel 4 line digital output 79 connected to a digital to analog converter circuit 80 which has an analog output connected to the second input of the summing network 72. The summing network adds the two analog signals from the differential amplifier 71 and the D/A converter 80 to produce the servo control signal 58.

The servo heater control output 58 of the summing network 72 is connected to one of three analog inputs of the heater power selector circuit 59. The second of three analog inputs 56 is connected to the output 56 of the manual control 27. The third analog input 30 is a preset level formed by a voltage divider which is the level set during an alarm condition.

The heater power selector subcircuit 59 is controlled by a digital signal 62 from the automatic mode control circuit 60 and a second digital signal 54 from the alarm circuit 61. The circuit 59 includes a pair of analog switches 1!2 and 113. The function of the switches 112 and 113 is to connect one of three analog inputs (servo, manual or preset) to the output 85. The output 85 is connected to the input of a voltage comparator 87 which has a second input 84 connected to a sawtooth wave generator 83. The voltage comparator 87 produces a pulse width modulated square wave output 40 whose ratio of "on" time to "off" time instantaneously varies with respect to the difference between the actual temperature and the setpoint temperature and varies in a slow stepwise manner to the difference between the setpoint and the equilibrium point temperature.

The modulated square wave output 40 of the control circuit 34 is connected via the opto-coupler triac driver circuit 39 to the heater power control triac 37. The analog output 85 is also connected to a bargraph driver circuit 86. The bargraph driver circuit illuminates a series of rectangular LED bars to display the power level. The bargraph driver is connected to two bargraphs, one for servo mode 25 and the other for manual mode 27. Only one of the two bargraphs are on at a given time as determined by the mode control signal 62.

The automatic mode control subcircuit 60 has an input from the temperature signal 52 connected to a comparator circuit 107 designed to produce an output signal 108 when the measured temperature is greater than 31C. The comparator output 108 is connected to the set input of a latch circuit 110 and to the input of a one-minute timer 121 of the alarm circuit 61. The latch circuit output 62 is connected to the heater power selector circuit to switch the control from manual to servo operation and the alarm circuit to enable the hi/lo alarm 31 and the probe dislodged timer. The hi/lo temperature and dislodged probe alarms 31 and 32 are active only in servo mode. The servo mode latch circuit 110 is reset to manual mode by a reset signal 50 which is active whenever the unit is powered up or the alarm silence button is pressed.

The alarm circuit 61 consists of five separate alarms: a hi/lo temperature alarm 31, a 39° C. temperature alarm circuit 32, a probe alarm 33 (open or dislodged), an overheating alarm 30, and a system fault alarm 43. The alarm signals from the first four alarms 30-33 are connected to an OR gate 122 whose output is a power cutback signal generated on signal line 54 which causes the heater power selector circuit 59 to switch to the preset level regardless of the state of the automatic mode circuit. The preset level is set to approximately 25% of full power.

The hi/lo temperature alarm circuit consists of two voltage comparators 97 & 98 which compare the output signal on, line 71 of the differential amplifier 70. This signal corresponds to the difference between the measured temperature and the temperature control setpoint to preset voltage levels equivalent to +0.5° C. and −0.5° C. temperature differential. The outputs of the two comparators are connected to an OR gate 81 so that either output will cause an alarm signal to be produced to one of two inputs of an AND gate 82 if the measured temperature differs from the control setpoint temperature by +/−0.5° C. Another input of the AND gate 82 is connected to the servo/manual signal 62 such that the hi/lo alarm 31 is enabled only in servo mode. The output 63 of the AND gate 82 is connected to the hi/lo alarm indicator 31 and to the enable input of a two minute timer 119. The output of the timer 119 is connected to an input of an OR gate 122. If the hi/lo alarm signal on line 63 is on for two minutes or more, the timer output 119 is activated which causes the OR gate output 54 to activate which sets the heater power circuit 35 to the preset power level.

The 39° C. alarm consists of a voltage comparator circuit 116 with the measured temperature signal 52 as one input and a voltage divider set to a voltage level equivalent to a 39° measured level as the second input. The output 64 of the comparator 116 is connected to the 39° C. alarm indicator 32 and to the OR gate 122. If the measured temperature exceeds 39° C., the 39° C. alarm indicator 32 is activated and the heater power is set to the reduced power mode.

The probe alarm 33 consists of a one minute timer 121 which is enabled by the servo mode signal on line 62 and the inverse of 31° C. temperature signal on line 108. If the unit is in servo mode and the probe temperature drops below 31° C. for 1 minute or longer, a signal from the output of the timer 121 is connected through an OR gate 120 to the probe fault output 65. The output 65 is thereby activated and the heater power is set to the preset level of approximately 25%. The one minute delay allows the probe location to be changed without activating the alarm. If the probe becomes open circuited, for example due to a broken wire, then the probe fault output 65 is immediately activated by the open probe comparator 117, the output of which is connected through the OR gate 120 to the output 65, and to an input of the OR gate 122 by which the heater power is reduced to the preset level. The timer is reset by the alarm silence & power-up reset signal 50.

The overheating alarm includes a square wave circuit 88 having an input connected to the heater current signal 45 from the Hall-Effect current pickup circuit 44. The square wave circuit 88 functions to amplify and hardlimit the AC signal from the Hall-Effect device 44, to produce a rectangular wave signal consisting of bursts of 60 Hz pulses for a duration proportional to the power delivered by circuit 35 to the heater 15. These pulses are connected to the clock input of a 24 bit binary counter 90. A 16 bit parallel digital output 91 of the counter 90 is connected to a programmable decoder 92 which generates an overheating alarm output signal 66 when the count of the counter 90 exceeds a predetermined number indicative of excessive total power to the heater during a predetermined time interval. The time interval is determined by a timer 93 which is preferably a 15 minute timer, connected through an OR gate 113 to the reset input 94 of the counter 90. The other input of OR gate 113 is connected to the reset timer 50. If the counter 90 fails to reach the predetermined count during the duration of the time period, the counter is reset and the cycle repeated. The overheating alarm output 66 is connected to the overheating alarm indicator 30 and to the OR gate 112 which causes the heater power to be set to the preset level if the alarm condition is present.

The system fail alarm circuit monitors the power control circuitry 35 for the heater 15. The signal on line 89, consisting of bursts of 60 Hz square wave pulses, is connected to a 20 millisecond retriggerable multivibrator circuit 95 whose output 96 is a rectangular waveform whose width is equal to the timer period that the heater 15 is actually on. The multivibrator output 96 is connected to one input of a two input exclusive-OR circuit 114, which has its second input connected to the heater control signal line 40 of the control circuit 34. The exclusive-OR circuit produces an output signal on line 99 to the input of an OR gate 123 whenever the power control signal on line 40 and the multivibrator output 96 representing heater current are not concurrent. The output of OR gate 123 is connected to the set input of a system fail latch circuit 100. The other input of OR gate 123 is connected to the shorted-probe voltage comparator output 115, which compares the signal at its input from line 52 with a voltage reference to recognize a shorted probe condition. The system fail latch 100 has an output 55 connected to the system fail circuit 43 which activates the power cut-off relay 41 and illuminates all the fault indicators 30,31,32,33. The latch circuit 100 has its reset input 118 connected to a power up reset signal 50.

AUTOMATIC SWITCHING TO SERVO MODE

In manual operation, the measured temperature by the probe 20 must remain below 31° C. During this time, the heater power is controlled by a voltage level derived directly from the setting of the front panel manual power level control 27. The open or shorted probe alarms, 33, the excessive heating alarm 30, and the system fault alarm 43 are active. If the probe temperature increases above 31° C., such as would be the case if placed on an infant, the automatic mode control switches to servo mode and latches unless reset by the alarm silence button 29 or by powering down the unit and turning back on. If the control is reset to manual with the probe temperature greater than 31° C., it will immediately switch back to servo mode. The manual power bargraph indicator 28 is illuminated only during manual operation and indicates the percentage of full power of the heater 15.

SELF ADJUSTING PROPORTIONAL CONTROL

In servo operation, the setpoint temperature and the measured temperature are each converted to an electrical voltage level with equal scale factors and applied at the respective inputs 53 & 52 of the control circuit 34. These two signals are compared by the op-amp voltage comparator 73. The output 74 of the comparator 73 is high or low depending on which of the two voltages is larger. This output signal 74 is communicated to the up/down control input of the 16 count binary counter 75. The counter 75 will have been present to count 8 when powered up and is clocked at a very slow rate of 1 clock every 2 minutes as determined by the timer 77. The binary counter will count up if the setpoint is above the measured temperature, and will, count down if the setpoint is below the measured temperature. Under steady state conditions the up/down switching will alternate at a 2 minute rate. The counter is inhibited from going any further if a count of 0 or 15 is reached. The output signals from the counter 75 are connected to a digital-to-analog converter circuit 80 which converts the count to a voltage 81 with a level proportional to the count of the counter 75. This level is scaled such that each count produces a voltage change equivalent to approximately 0.05° C. This voltage 81 is added as an offset to the signal 71, representing the difference between the measured temperature and setpoint voltages, by the summing network 72 which produces the servo mode heater control signal 58. Thus, the heater output, with the control at equilibrium, will be adjusted slightly up or down depending on whether the setpoint is above or below the measured temperature. This will continue until the control comes to equilibrium precisely at the setpoint. Once this occurs, the proportional control is precisely compensated for the environmental conditions which influence the rate of heat loss from the unit 10, yet will respond immediately to measured temperature variations from the sensor 20.

PROTECTION FROM OVERHEATING OF PATIENT

The heater output is controlled by switching the heater on and off for a number of cycles of the line current as determined by the proportional control. The ratio of ON time to the total time available is related to the percentage of maximum power. By monitoring the 60 Hz heater current signal during a definitive time interval, the average percentage of full heater power is determined. A heater current signal is developed by passing the current through an inductor coil 47 (FIG. 3). The magnetic field set up by the heater current passing through the inductor 47 is detected by a Hall-Effect device 44 which has an electrical output 45 proportional to the magnetic field set up by the heater current in circuit 35. The heater current signal is used by the heat alarm circuits 61 which generates both the excessive heating alarm signal on output 66 and the heater power control monitor which controls the system fail alarm at output 55.

The heater current signal from input 45 is converted to a square wave and used to clock the totalizing counter-decoder 90 that will output a signal at a predetermined count. The counter will count the 60 Hz current signal in bursts equal in duration to the ON time until the count equals the predetermined value or is reset. For example, if the heater is on 50% power for 15 minutes then the count would be:

$$50/100 \times 60 \text{ Hz} \times 60 \text{ sec/min} \times 15 \text{ min} = 2700.$$

The counter 90 is reset at preset time intervals determined by the timer 93. If the counter 90 reaches the preset count total within the preset time interval, then the circuit 61 activates the alarm 30 and reduces power to a safe value by switching to a preset level of 25% for full power. If the counter 90 does not reach the preset count within the time interval, it is reset to start a new monitoring period. For example, if the counter is reset every 15 minutes, and the preset count to alarm is 27000, then if the power level averaged more than 50% it would alarm.

The following are example cases:
At 100% power the alarm will go off in 7.5 min. $(100/100 \times 60 \times 60 \times 7.5 = 27000)$
At 60% power the alarm would go off in 12.5 min. $(60/100 \times 60 \times 60 \times 12.5 = 27000)$
At 40% power level the alarm would not go off. The counter 90 would be reset to 0 at 15 minutes prior to the count reaching 27000. $(40/100 \times 60 \text{ Hz} \times 60 \text{ sec/min} \times 15 \text{ min} = 21600)$ Therefore, the system will alarm if the heater output exceeds a preset amount during a predetermined time interval. The actual values for the percentage of power and time interval are adjustable to allow for variation in heaters,, but should approximately equal to that percentage of heater power needed to produce an irradiance of 20 milliwatts per square centimeter measured 4 inches above the bed 12 for 15 minutes.

The skin temperature is converted to a voltage which is displayed on the digital display 26 using a DVM (digital voltmeter) circuit. This voltage also goes to the alarm board. A series of four voltage comparators 117, 107, 116 and 115 detect the following temperatures: (1) out-of-range low—open probe alarm 117, (2) greater than 31° C.—servo mode active 107, (3) greater than 39° C. —high temp alarm 116, and (4) out-of-range high—shorted probe alarm 115. When the unit is turned on, the servo-manual latch 110 is placed in its manual mode by a reset signal from reset input 50. Whenever a skin probe temperature of 31C or greater is sensed by the sensor 20, the latch 110 sets to servo mode. If the skin probe temperature is above 31° C., then drops below 31° C., the latch 110 will stay in servo mode until the alarm silence button 29 is pressed.

PROTECTION AGAINST LOSS OF HEATER CONTROL

The heater current monitoring is provided by passing the heater current through the inductor coil 47 which is magnetically coupled to a linear Hall-effect device 44. The output of the Hall-effect device is an AC voltage proportional to the heater current. This voltage is converted to a square wave in the circuit 88 and is used to trigger the 20 millisecond retriggerable one-shot multivibrator 95. Since the period of the 60 Hz current waveform is 16.6 milliseconds, the output of the multivibrator 95 is a constant high logic level when the heater is on and low when it is off. This level is compared using an 'exclusive OR' logic circuit with the heater control signal from the analog output 40. If the two signals differ, the exclusive-OR circuit triggers a latch circuit 100. The latch 100 will also activate if the heater current is off when it should be on. Thus, it immediately latches if the heater, fuse or thermal switch fails open circuited. Thus, a signal is also generated before the infant gets cold or low temperature alarm goes off.

The present invention represents a significant improvement in the safety of infants nursed under radiant warmers.

Having described the invention, what is claimed is:

1. An infant warmer bed comprising:
   a base;
   an infant support surface mounted on said base;
   a heating circuit connectable to a source of electrical energy to energize a heating element connected therein;
   a heating element supported on said base and connected in said heating circuit, said element being so positioned and operable to generate heat onto said surface when electrically energized;
   means connected in said heating circuit for varying the electrical energy supplied to said element in response to a control signal;
   a control circuit having an output connected to said energy varying means for delivering said control signal thereto, said control circuit having an input for receiving a temperature signal; and
   a temperature sensing probe positionable at said support surface and attachable to the skin of an infant supported on said surface, said probe having an output connected to the input of said control circuit and operable to generate a temperature signal responsive to the temperature sensed at said probe; and
   said control circuit including
      means for generating an intermediate signal in response to the difference between the temperature signal and a predetermined temperature setting; and
      means for generating an offset signal and for algebraically adding said offset signal and said intermediate signal so as to produce said control signal responsive to the algebraic sum of said offset signal and the difference between said temperature signal and said temperature setting; and
      said offset signal generating means including means responsive to the sign of the difference between said temperature setting and said temperature signal for periodically and cumulatively incrementing said offset signal a predetermined amount, up or down in accordance with said sign of said difference.

2. The infant warmer of claim 1 wherein said offset signal incrementing means is operable to increase said offset signal in response to said temperature signal being less than said temperature setting and to decrease said offset signal when said temperature signal is greater than said temperature setting.

3. The infant warmer of claim 1 wherein said control circuit includes:
   means for generating said control signal at a predetermined level, in response to a manually initiated command signal, while said temperature signal remains less than said predetermined temperature setting up to a predetermined maximum amount of time after the heating element is energized, and for thereafter generating said control signal in accordance with said intermediate signal.

4. The infant warmer of claim 1 wherein said control circuit further comprises:
   means for generating a monitoring signal in accordance with the energizing of said heating element;
   means for comparing said monitoring signal with said control signal and for generating an alarm signal whenever said either monitoring signal or said control signal exists exclusive of the other; and
   means for disabling the energizing of said element in response to said alarm signal.

5. An infant warmer bed comprising:
   a base;
   an infant support surface mounted on said base;
   a heating circuit connectable to a source of electrical energy to energize a heating element connected therein;
   a heating element supported on said base and connected in said heating circuit, said element being so positioned and operable to generate heat onto said surface when electrically energized;
   means connected in said heating circuit for varying the electrical energy supplied to said element in response to a control signal;
   a control circuit having an output connected to said energy varying means for delivering said control signal thereto, said control circuit having an input for receiving a temperature signal; and
   a temperature sensing probe positionable at said support surface and attachable to the skin of an infant supported on said surface, said probe having an output connected to the input of said control circuit and operable to generate a temperature signal responsive to the temperature sensed at said probe;
   said control circuit including:
      means for generating an intermediate signal in response to the difference between said temperature signal and a predetermined temperature setting; and
      means for generating an offset signal and for combining said offset signal with said intermediate signal to produce said control signal responsive to said offset signal and to the difference between said temperature signal and said temperature setting; and
      said offset signal generating means including means responsive to the relation of said temperature setting to said temperature signal for intermittently and incrementally modifying said offset signal; and
   wherein said control circuit further comprises:
      means for generating an energy level signal responsive to the amount of electrical energy supplied to said element during an interval of time, and for altering said control signal so as to reduce the electrical energy to said element in response to said energy level signal when the amount of energy supplied to said element during said interval exceeds a predetermined energy level.

6. An infant warmer bed comprising:

a base;

an infant support surface mounted on said base;

a heating circuit connectable to a source of electrical energy to energize a heating element connected therein;

heating element mounted on said base connected in said heating circuit, said element being so positioned and operable to generate heat onto said surface when electrically energized;

means connected in said heating circuit for varying the electrical energy to said element in response to a control signal;

a control circuit having an output connected to said energy varying means for supplying said control signal thereto, said control circuit having an input for receiving a temperature signal; and a temperature sensing probe positionable at said support surface and attachable to the skin of an infant supported on said surface, said probe having an output connected to the input of said control circuit and operable to generate a temperature signal responsive to the temperature sensed at said probe; and said control circuit including means for generating said control signal in response to said temperature signal so as to maintain the temperature at said probe at a predetermined temperature setting; and for generating an energy means for generating an energy level signal responsive to the amount of electrical energy supplied to said element during an interval of time, and for altering said control signal so as to reduce the electrical energy to said element in response to said energy level signal when the amount of energy supplied to said element during such interval exceeds a predetermined energy level.

7. The infant warmer of claim 6 wherein said control circuit further comprises means for resetting said energy level signal at the end of said interval of time, said energy level signal generating means being operative to generate said energy level signal responsive to the amount of electrical energy supplied to said element during a second interval of time subsequent to the resetting by said resetting means.

8. The infant warmer of claim 6 wherein said control circuit includes:

means for generating said control signal at a predetermined level, in response to a manually initiated command signal, while said temperature signal remains less than said predetermined temperature setting up to a predetermined maximum amount of time after the heating element is energized, and for thereafter generating said control signal in accordance with said intermediate signal.

9. The infant warmer of claim 6 wherein said control circuit further comprises:

means for generating a monitoring signal in accordance with the energizing of said heating element;

means for comparing said monitoring signal with said control signal and for generating an alarm signal whenever said either monitoring signal or said control signal exists exclusive of the other; and means for disabling the energizing of said element in response to said alarm signal.

10. An infant warmer bed comprising:

a base;

an infant support surface mounted on said base;

a power circuit connectable to a source of electrical energy;

a heating element mounted on said base connected in said power circuit to be energized thereby, said element being so positioned and operable to generate heat onto said surface when electrically energized;

means connected in said power circuit for varying the electrical energy to said element in response to a control signal;

a control circuit having an output connected to said energy varying means for supplying said control signal thereto, said control circuit having an input for receiving a temperature signal;

a temperature sensing probe positionable at said support surface and attachable to the skin of an infant supported on said surface, said probe having an output connected to the input of said control circuit and operable to generate a temperature signal responsive to the temperature sensed at said probe; and said control circuit including:

means for generating an intermediate signal in response to the difference between said temperature signal and a predetermined threshold signal, and manual startup means for generating said control signal at a predetermined level, in response to a manually initiated command signal, said manual startup means being operative only while said temperature signal remains less than said threshold signal and for up to a predetermined maximum amount of time after the heating element is energized, and automatic temperature control means operative after said temperature signal equals said threshold signal and after said predetermined maximum amount of time after the heating element is energized, and inoperative when said manual startup means is operative, for generating said control signal in accordance with said intermediate signal.

11. The infant warmer of claim 10 wherein the predetermined level is a constant level.

12. The infant warmer of claim 10 wherein said control circuit further comprises:

means for generating a monitoring signal in accordance with the energizing of said heating element;

means for comparing said monitoring signal with said control signal and for generating an alarm signal whenever either said monitoring signal or said control signal, exists exclusive of the other; and means for disabling the energizing of said element in response to said alarm signal.

* * * * *